(12) United States Patent
Colak et al.

(10) Patent No.: US 12,286,536 B2
(45) Date of Patent: Apr. 29, 2025

(54) BIODEGRADABLE THERMOPLASTIC MATERIAL MADE FROM CASEIN AND/OR CASEINATE

(71) Applicant: LACTIPS, Saint-Paul-en-Jarez (FR)

(72) Inventors: Basak Yilin Colak, Vaulx en Velin (FR); Marie-Helene Gramatikoff, Ternay (FR); Maxime Dememe, Saint Etienne (FR); kheirdine Mellouki, Sury le Comtal (FR); Frederic Prochazka, Saint Genest Malifaux (FR)

(73) Assignee: LACTIPS, Saint-Jean-Bonnefonds (FR)

( * ) Notice: Subject to any disclaimer, the term of this patent is extended or adjusted under 35 U.S.C. 154(b) by 506 days.

(21) Appl. No.: 16/956,364

(22) PCT Filed: Dec. 19, 2018

(86) PCT No.: PCT/FR2018/053423
§ 371 (c)(1),
(2) Date: Jun. 19, 2020

(87) PCT Pub. No.: WO2019/122726
PCT Pub. Date: Jun. 27, 2019

(65) Prior Publication Data
US 2021/0079223 A1 Mar. 18, 2021

(30) Foreign Application Priority Data

Dec. 19, 2017 (FR) ..................... 1762549

(51) Int. Cl.
*C08L 89/00* (2006.01)
*C08J 5/18* (2006.01)
*C08K 5/00* (2006.01)
*C08K 5/09* (2006.01)

(52) U.S. Cl.
CPC ............... *C08L 89/005* (2013.01); *C08J 5/18* (2013.01); *C08K 5/0016* (2013.01); *C08K 5/09* (2013.01); *C08J 2300/16* (2013.01); *C08J 2300/22* (2013.01); *C08J 2389/00* (2013.01); *C08L 2201/06* (2013.01); *C08L 2203/16* (2013.01)

(58) Field of Classification Search
CPC .............. C08L 89/005; C08L 2201/06; C08L 2203/16; C08J 5/18; C08J 2300/16; C08J 2300/22; C08J 2389/00; C08K 5/0016; C08K 5/09
See application file for complete search history.

(56) References Cited

U.S. PATENT DOCUMENTS

| 4,076,846 A | 2/1978 | Nakatsuka et al. |
| 5,922,379 A | 7/1999 | Wang |
| 2014/0251180 A1 | 9/2014 | Freeman et al. |
| 2015/0013569 A1 | 1/2015 | Domaske |

FOREIGN PATENT DOCUMENTS

| CA | 1061163 | 8/1979 | |
| CA | 2235931 A1 | 10/1998 | |
| CN | 106189271 A | 12/2016 | |
| EP | 1075188 A1 | 2/2001 | |
| EP | 2336235 A1 | 12/2009 | |
| FR | 2963013 | 1/2012 | |
| KR | 1020000053078 A | 8/2000 | |
| KR | 1020100117765 A | 11/2010 | |
| WO | 1998020073 A2 | 5/1998 | |
| WO | 99/43497 A1 | 9/1999 | |
| WO | 99/56556 A1 | 11/1999 | |
| WO | 2000049899 A1 | 8/2000 | |
| WO | WO-2006042364 A1 * | 4/2006 | ............... B32B 1/02 |

OTHER PUBLICATIONS

Qiannan Xun et al., "Packaging Performance of Gelatin-sodium Caseinate Edible Composite Film", Packaging Engineering, Issue 15, pp. 48-53 (Aug. 10, 2013). English abstract included.

* cited by examiner

*Primary Examiner* — Angela C Scott
(74) *Attorney, Agent, or Firm* — Meunier Carlin & Curfman LLC

(57) ABSTRACT

A casein and/or caseinate based biodegradable thermoplastic. In particular, a biodegradable thermoplastic which includes:

a) between 50 and 80% casein and/or caseinate, preferably between 55 and 70%;
b) between 4 and 12% water, preferably between 5 and 11%;
c) between 10 and 35% of at least one plasticizer different from b), preferably between 15 and 28%;
d) between 0.1 and 8% of a hydrophobic agent, preferably between 1 and 4%;
e) between 0.5 and 6% of at least one surfactant, preferably between 2 and 4%.

22 Claims, 7 Drawing Sheets

BIODEGRADABLE THERMOPLASTIC MATERIAL MADE FROM CASEIN AND/OR CASEINATE

FIELD OF THE INVENTION

The field of the invention is that of biodegradable and biosourced thermoplastics, more specifically casein and/or caseinate based thermoplastics.

In particular, the present invention relates to a biodegradable thermoplastic comprising:
a) between 50 and 80% casein and/or caseinate, preferably between 55 and 70%;
b) between 4 and 12% water, preferably between 5 and 11%;
c) between 10 and 35% of at least one plasticizer different from b), preferably between 15 and 28%;
d) between 0.1 and 8% of a hydrophobic agent, preferably between 1 and 4%;
e) between 0.5 and 6% of at least one surfactant, preferably between 2 and 4%.

The subject of the invention is also the biodegradable thermoplastic in various different forms, in particular in pellet form constituting a raw material for transformation thereof into various objects, such as films, threads or molded articles.

The invention also targets a packaging film obtained from this thermoplastic, and more specifically a packaging for hygroscopic products, such as detergent tablets, made from this film.

TECHNOLOGICAL BACKGROUND

The decreasing nonrenewable resources, such as petroleum, and the increase of pollution related to these resources are driving the development of alternative, less polluting and more environmentally respectful, alternative solutions.

In the field of plastics, new biodegradable materials are being developed. These new materials can be made from polymers with natural origin or synthetic polymers. For example, vegetable proteins, such as corn and soy proteins, or animal proteins can be used to make packaging.

Among animal proteins, casein is particularly attractive. In fact, this protein coming from milk is available in large quantities and the films based on casein have good transparency and good biodegradability.

The document FR 2,963,013 describes casein and/or caseinate based biodegradable thermoplastic pellets and the production method thereof. These pellets can be used to make thermoplastic films. However, these thermoplastic films are not easily usable industrially. For example, the film is sometimes sticky; it is then difficult, or even impossible, to unwind the rolls of film by using industrial equipment because the various layers stick to each other. Further, when these films are used for packaging detergent tablets or these tablets are stored under conditions of low relative humidity (for example 30%), they can sometimes become brittle and tear, to the point of no longer playing their packaging role.

Objectives

In this context, the present invention aims to satisfy at least one of the following objectives.

One of the essential objectives of the invention is to supply a casein and/or caseinate based biodegradable thermoplastic which is usable industrially, meaning in particular transformable in intermediate or finished product, with simple or complex shape, by techniques such as injection, extrusion, film-blowing, solvent casting, thermoforming or machining.

Another essential objective of the invention is to provide a casein and/or caseinate based biodegradable thermoplastic film which can be put in a roll and unwound.

Another essential objective of the invention is to provide a casein and/or caseinate based biodegradable thermoplastic film which can be used, in particular, for packaging hygroscopic products, like detergent tablets.

BRIEF DESCRIPTION OF THE INVENTION

In the first place, the invention relates to a biodegradable thermoplastic characterized in that it comprises:
a) between 50 and 80% casein and/or caseinate, preferably between 52 and 75%, and still more preferably between 55 and 70%;
b) between 4 and 13% water, preferably between 4.5 and 12%, and still more preferably between 5 and 11%;
c) between 10 and 35% of at least one plasticizer different from b), preferably between 12 and 32%, and still more preferably between 15 and 28%,
d) between 0.1 and 8% of a hydrophobic agent, preferably between 0.5 and 6%, and still more preferably between 1 and 4%;
e) between 0.5 and 6% of at least one surfactant, preferably between 1 and 5%, and still more preferably between 1.5 and 4.5%.

The biodegradable thermoplastic such as described above can be used industrially. In fact, a film can be obtained with this material which can be wound in a roll and then easily unwound.

This suitability for rolling and unrolling at industrial rate is a key parameter of the film made from the casein thermoplastic and according to the invention.

Further, this film can be used for packaging various products such as hygroscopic products, like detergent tablets, because even when the tablets are stored under conditions of low relative humidity, the film retains its integrity.

Further, in some cases, the film produced is edible. It can therefore be used for various applications such as packaging food products, ingredients or additives, edible packaging, single doses of food ingredients to be dissolved, and single doses of food additives. It can also be used as a separating sheet.

Photos 5A and 5B are photos of detergent tablets packaged in a printed film according to example 5 after a five-day packaging test.

Figure 6:
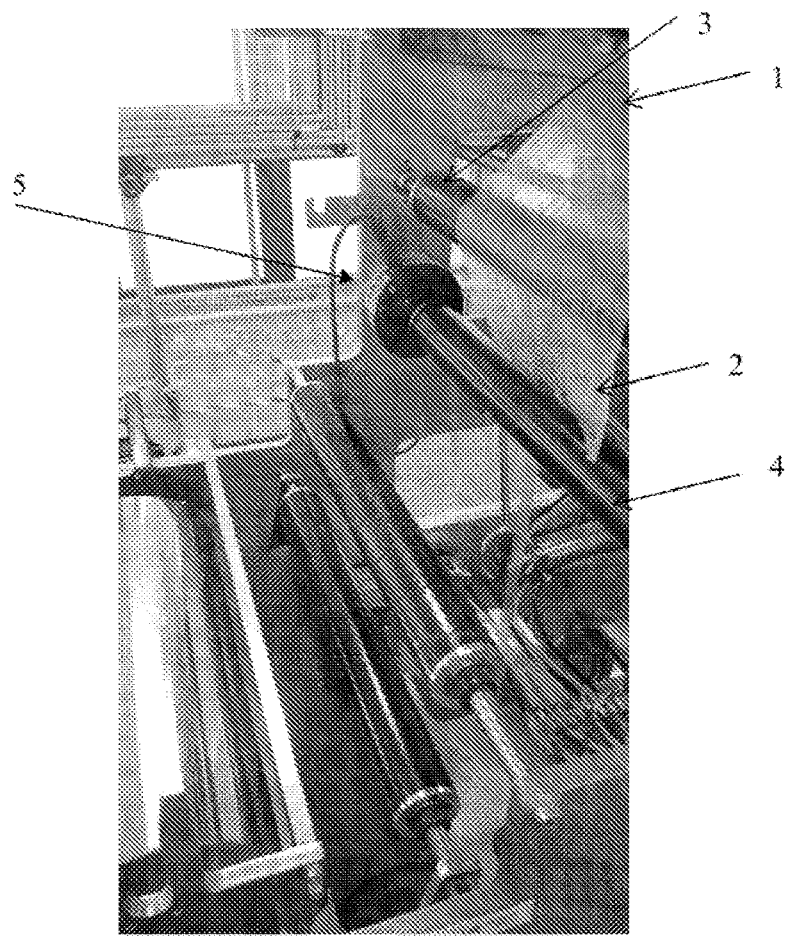
Figure 7A:
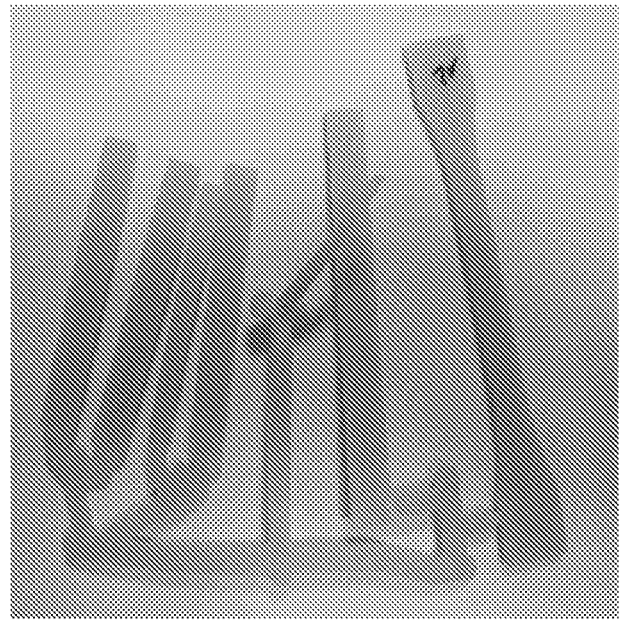
Figure 7B:
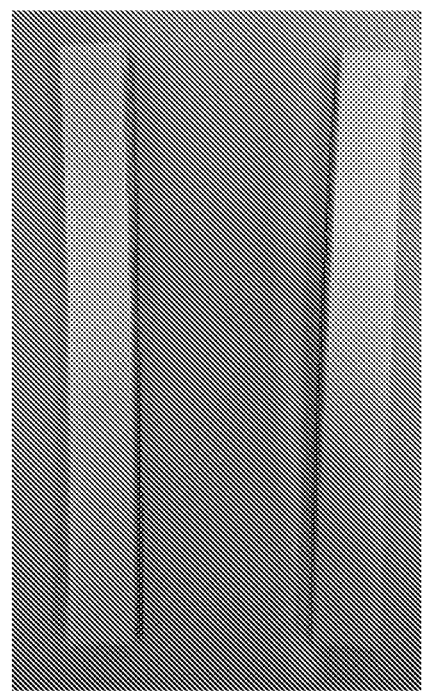

FIG. 6 is a photo of the unrolling test facility used for evaluation of films made from casein thermoplastics in the examples.

Photos 7A and 7B are photos of parts obtained by injection, from biodegradable thermoplastic pellets according to example 4.

DEFINITIONS

"Thermoplastic" is understood to mean, for example, a material which becomes malleable and foldable above a given temperature, the glass transition temperature Tg, but which below this Tg again becomes hard; these transformations are reversible.

"Biodegradable" is understood to mean a material which can be decomposed under the action of microorganisms (e.g. bacteria, fungus, algae, etc.). The result of this decomposition is the formation of water, $CO_2$ and/or methane and possibly byproducts (e.g. residues, new biomass) that are non-toxic for the environment. For example, it involves a biodegradable material according to the European EN NF 13432 standard.

"Between x and y" is understood to mean, for example, that the limits x and y are included in the interval [x,y].

"Hydrosoluble" is understood to mean, for example, what dissolves in water. Hydrosolubility of a film can be measured in the following way: a piece of film (5 cm×5 cm, die cut) is fixed on a slide carrier and then immersed in a 1000 mL capacity beaker containing 600 mL distilled water at 20° C. under stirring with a magnetic bar at 300 RPM. The time for a hole to form in the film is measured. The disintegration of the film leads to the formation of film particles. The test lasts five minutes at the end of which the particles are passed through a 0.5 mm sieve for verifying the size of the particles. When there are no particles in the sieve, the film is considered to be hydrosoluble.

"Plasticizer" is understood to mean, for example, a substance with which to lower the glass transition temperature Tg of the material.

"Detergent" is understood to mean for example a composition which has cleaning properties. Among detergents, products in powder or compacted powder form for dishwashers and laundry can be listed.

"Hydrophobic" is understood to mean, for example, a compound having a low affinity for water and tending to not dissolve in it. Typically, it involves a predominantly apolar compound.

"Hydrophilic" is understood to mean, for example, a compound having an affinity for water and tending to dissolve in it. Typically it involves a compound with polar groups capable of forming hydrogen bonds.

"Surfactant" is understood to mean, for example, an amphiphilic molecule, meaning a molecule having both hydrophilic and hydrophobic properties.

"HLB" is understood to mean, for example, the hydrophilic-lipophilic balance. The following method can be used to calculate the HLB value: HLB=20×(molar mass of the hydrophobic part)/(molar mass of the molecule).

"Sequestering agent" is understood to mean, for example, ligands which form chemical complexes with metal ions such as copper, iron, nickel, calcium and magnesium.

"Fatty acid" is understood to mean, for example, an aliphatic carboxylic monoacid.

The proportions of the various constituents a), b), c), d), and e), and possibly f) and g), are expressed in % by mass relative to the total mass of the thermoplastic at ambient temperature.

DETAILED DESCRIPTION OF THE INVENTION

The biodegradable thermoplastic may be hydrosoluble. The biodegradable thermoplastic may be printable and/or printed.

The thermoplastic comprises a) between 50 and 80%, preferably between 52 and 75%, and even more preferably between 55 and 70%, or still better between 60 and 65% of casein and/or caseinate.

Casein is a protein found in milk which is insoluble in water. It is principally obtained by precipitation by adding an acid to the milk (acid casein) or pressure (pressure casein).

Casein consists of a mixture of α-casein, β-casein and κ-casein having molar masses included between 19,000 and 25,000 g/mole. Caseinate is understood to mean, for example, a salt of casein whose counterion is selected from the group comprising—preferably composed of—calcium, potassium, ammonium, sodium and magnesium.

According to an embodiment of the thermoplastic, a) comprises at least one casein.

According to another embodiment of the thermoplastic, a) comprises at least one caseinate, for example sodium caseinate, or a mixture of caseinates.

According to another embodiment of the thermoplastic, a) comprises a mixture of casein and at least one caseinate. In this case, the ratio by mass between the casein and caseinate(s) may be included between 5/95 and 95/5, 20/80 and 80/20, or 40/60 and 60/40.

The thermoplastic comprises b) between 4 and 13% water, preferably between 4.5 and 12%, and even more preferably between 5 and 11%, or still better between 7 and 10.5% water. The water acts as a plasticizer which must be distinguished from the plasticizer c) entering into the composition of the thermoplastic according to the invention.

This latter in fact comprises c) between 10 and 35%, preferably between 12 and 32%, and even more preferably between 15 and 28%, or still better between 20 and 25% of at least one plasticizer c), different from b).

This plasticizer c) may be selected from polyols, glycerol acetates, glycerol propionates and mixtures thereof.

The following can be given as examples of polyols: glycerol, hexanetriol, glycols, including ethylene glycol, and sugars and derivatives thereof.

The following can be given as examples of sugars: disaccharides, such as maltose, lactose, and saccharose and monosaccharides such as fructose.

Among the sugar derivatives, the following can be listed as examples of hydrogenated derivatives thereof: sorbitol, maltitol, mannitol and xylitol, or even the transformation products of these hydrogenated derivatives such as sorbitan.

According to an embodiment of the thermoplastic, the plasticizer c) is selected from glycerol, sorbitol, mannitol, ethylene glycol and mixtures thereof. Preferably, the plasticizer c) is glycerol.

The plasticizer c) may contain residual water.

The plasticizer c) serves to lower the viscosity of the product by increasing the mobility of the molecular chains.

Advantageously, the plasticizer c) is a hydrophilic plasticizer.

The thermoplastic comprises d) between 0.1 and 8%, preferably between 0.5 and 6%, and even more preferably between 1 and 4%, or still better between 1 and 3% of a hydrophobic agent d).

The hydrophobic agent d) may be selected from:
carboxylic polyacid esters;

C3-C33 carboxylic acids, preferably C4-C28 fatty acids, and, even more preferably, C6-C28 unsaturated fatty acids;

and mixtures thereof.

The carboxylic polyacid esters may come from at least one carboxylic polyacid and at least one alcohol, preferably a C1-C18 alcohol.

Among the carboxylic poly acids preferably chosen in the scope of the invention, citric acid, hydroxycitric acid, tartric acid, malic acid, oxalic acid, malonic acid, succinic acid, glutaric acid, adipic acid, maleic acid and fumaric acid can be mentioned.

Among the preferred alcohols conforming to the invention, the C2-C6 alcohols like for example ethanol, n-propanol, isopropanol, n-butanol and tert-butanol can be mentioned.

According to an embodiment of the thermoplastic, the hydrophobic agent d) is selected from trithyl citrate, tributyl O-acetylcitrate, tributyl citrate and mixtures thereof.

According to an embodiment, the hydrophobic agent d) is a C3-C33 carboxylic acid, preferably a C4-C28 fatty acid, and, even more preferably, a C6-C28 unsaturated fatty acid.

Among the C4-C28 fatty acids selected in the scope of the invention, caprylic acid, capric acid, lauric acid, myristic acid, palmitic acid, stearic acid and mixtures thereof can be mentioned.

Among the particularly attractive C6-C28 unsaturated fatty acids, palmitoleic acid, oleic acid, linoleic acid and mixtures thereof can be mentioned.

The thermoplastic comprises e) between 0.5 and 6%, preferably between 1 and 5%, and even more preferably between 1.5 and 4.5%, or still better between 2 and 4% of at least one surfactant.

According to an embodiment of the thermoplastic, the surfactant e) is selected from zwitterionic surfactants whose HLB is included between 2 and 8.

Among the preferred surfactants, lecithin and or analogs thereof such as diacetylenic phosphonates can be mentioned.

According to an embodiment of the thermoplastic, the ratio of the quantities e) to d) is greater than or equal to 1. For example, this ratio may be included between 1.3 and 3; preferably between 1.5 and 2.5.

According to an embodiment of the thermoplastic, said material comprises between 1 and 5% of an additive f) selected from sequestering agents. Among the sequestering agents, diammonium citrate, EDTA, phosphates, citric acid, pyrophosphates, and mixtures thereof can be cited.

According to an embodiment of the thermoplastic, said material also comprises an additive g) selected from colorings, protein coagulants, and anticaking agents, sliding agents and mixtures thereof. Among the coagulants, citric acid and acetic acid can be mentioned. Among the anticaking agents, colloidal silica can be mentioned. Among the sliding agents, polyethylene glycols and fatty chain compounds, preferably in C12-C28, with a terminal amide can be cited. Polyvinylic alcohol can be mentioned among the unmolding agents. The biodegradable thermoplastic may comprise between 0.1% and 5% of g).

According to an embodiment of the biodegradable thermoplastic, said material comprises:
a) between 50 and 80% casein and/or caseinate, preferably between 52 and 75%, and still more preferably between 55 and 70% or still better between 60 and 65%;
b) between 4 and 13% water, preferably between 4.5 and 12%, and even more preferably between 5 and 11%, or still better between 7 and 10.5%;
c) between 10 and 35% glycerol, preferably between 12 and 32/6, and even more preferably between 15 and 28%, or still better between 20 and 25%;
d) between 0.1 and 8% of a C6-C28 unsaturated fatty acid, preferably between 0.5 and 6%, and still more preferably between 1 and 4% or still better between 1 and 3%;
e) between 0.5 and 6% lecithin, preferably between 1 and 5%, and even more preferably between 1.5 and 4.5%, or still better between 2 and 4%.

According to a specific embodiment, the biodegradable thermoplastic is made solely from components which can be used in the agro-food industry, meaning components included in the Codex Alimentarius. In this case, the biodegradable thermoplastic is edible, meaning that it can be eaten without risk for the body. For example, when the biodegradable thermoplastic is made of:
a) casein and/or caseinate;
b) water;
C) glycerol;
d) oleic acid; and
e) lecithin,
the thermoplastic is edible.

Typically, the biodegradable thermoplastic is in pellet or film form. The invention also relates to pellets of the thermoplastic such as described above.

The invention also relates to one or several pellets comprising:
a) between 50 and 80% casein and/or caseinate, preferably between 52 and 75%, and still more preferably between 55 and 70% or still better between 60 and 65%;
b) between 4 and 13% water, preferably between 4.5 and 12%, and even more preferably between 5 and 11%, or still better between 7 and 10.5%;
c) between 10 and 35% of at least one plasticizer different from b), preferably between 12 and 32%, and still more preferably between 15 and 28%, or still better between 20 and 25%;
d) between 0.1 and 8% of a hydrophobic agent, preferably between 0.5 and 6%, and even more preferably between 1 and 4%, or else even between 1 and 3%;
e) between 0.5 and 6% of at least one surfactant, preferably between 1 and 5%, and even more preferably between 1.5 and 4.5%, or still better between 2 and 4%.

According to an embodiment of the pellet(s), said pellet comprises:
a) between 50 and 80% casein and/or caseinate, preferably between 52 and 75%, and still more preferably between 55 and 70% or still better between 60 and 65%;
b) between 4 and 13% water, preferably between 4.5 and 12%, and even more preferably between 5 and 11%, or still better between 7 and 10.5%;
c) between 10 and 35% glycerol, preferably between 12 and 32%, and even more preferably between 15 and 28%, or still better between 20 and 25%;
d) between 0.1 and 8% of a C6-C28 unsaturated fatty acid, preferably between 0.5 and 6%, and still more preferably between 1 and 4% or still better between 1 and 3%;
e) between 0.5 and 6% lecithin, preferably between 1 and 5%, and even more preferably between 1.5 and 4.5%, or still better between 2 and 4%.

Typically, the pellet is hydrosoluble. The pellet may be edible.

The invention also relates to an object which could be obtained after transformation by extrusion casting, extrusion blowing, film blowing, solvent casting, calendaring, injection, heat forming or drawing of the thermoplastic such as described above.

In particular, the films which could be obtained from the thermoplastic such as described above may be mentioned.

The invention also relates to a film obtained from the thermoplastic such as described above. The film can be obtained, for example, by film blowing of pellets of the thermoplastic such as described above. The film is a biodegradable thermoplastic film. The film can be printed. Typically, the film has a thickness included between 15 and 100 μm, preferably between 30 and 80 μm and more preferably between 40 and 70 μm. The film can be printed directly before rolling or in a second step of unrolling, cutting and rerolling by a conventional method for printing in plastics processing, such as flexographic printing.

The invention also relates to a film comprising:
 a) between 50 and 80% casein and/or caseinate, preferably between 52 and 75%, and still more preferably between 55 and 70% or still better between 60 and 65%;
 b) between 4 and 13% water, preferably between 4.5 and 12%, and even more preferably between 5 and 11%, or still better between 7 and 10.5%;
 c) between 10 and 35% of at least one plasticizer different from b), preferably between 12 and 32%, and still more preferably between 15 and 28%, or still better between 20 and 25%;
 d) between 0.1 and 8% of a hydrophobic agent, preferably between 0.5 and 6%, and even more preferably between 1 and 4%, or else even between 1 and 3%;
 e) between 0.5 and 6% of at least one surfactant, preferably between 1 and 5%, and even more preferably between 1.5 and 4.5%, or still better between 2 and 4%.

According to an embodiment of the film, said film comprises:
 a) between 50 and 80% casein and/or caseinate, preferably between 52 and 75%, and still more preferably between 55 and 70% or still better between 60 and 65%;
 b) between 4 and 13% water, preferably between 4.5 and 12%, and even more preferably between 5 and 11%, or still better between 7 and 10.5%;
 c) between 10 and 35% glycerol, preferably between 12 and 32%, and even more preferably between 15 and 28%, or still better between 20 and 25%;
 d) between 0.1 and 8% of a C6-C28 unsaturated fatty acid, preferably between 0.5 and 6%, and still more preferably between 1 and 4% or still better between 1 and 3%;
 e) between 0.5 and 6% lecithin, preferably between 1 and 5%, and even more preferably between 1.5 and 4.5%, or still better between 2 and 4%.

Typically, the film is hydrosoluble. The film can be edible. The film can be heat shrinkable.

An object of the invention is also the use of a thermoplastic, for example a film, such as described above for packaging various products (e.g. pharmaceutical, food, chemical, cosmetic, etc.) in particular hygroscopic products, and even more specifically detergents. The product may be in solid or liquid form.

The invention also relates to a product packaged by a thermoplastic such as described above, for example by a film such as described above. The packaged product can be selected from pharmaceutical, food, chemical, and cosmetic products.

According to an embodiment, the packaged product is a food product, like for example meat, fish, vegetables, fruits, pastries, pies and cakes, food additives, ingredients, dry preparations and food powders. According to a specific embodiment, the thermoplastic used for packaging the food product is an edible film. According to a specific embodiment, the packaged product is a detergent tablet.

According to an embodiment, the packaged product is a liquid product, like for example liquid shampoo or liquid laundry product.

The invention also relates to a detergent packaged by a thermoplastic such as described above, for example by a film such as described above.

The detergents can be in liquid or powder form, compacted or not. For example, it may involve a detergent tablet. Among the detergent tablets, the tablets of product for dishwasher and the laundry tablets can be mentioned.

According to another of the aspects thereof, the invention relates to a method for production of the thermoplastic such as described above.

This method preferably comprises the following steps:
 E1. using an extruder, preferably a twin-screw extruder;
 E2. adding compounds a) to e), and possibly f), into the extruder;
 E3. retrieving at least one extruded rod of thermoplastic;
 E4. possibly drying the rod;
 E5. possibly crushing of the rod into pellets.

Advantageously step E1 consists of operating the extruder with the following parameters: rotation speed included between 100 and 150 RPM, and at a temperature included between 70 and 120° C.

Step E2 preferably consists of adding, at the same time or successively, preferably successively,
 in a first step,
  at least one part of compounds a) to e), and possibly f), come in solid form, advantageously powder form, and,
 in a second step,
  at least one part of compounds a) to e), and possibly f), come in advantageously liquid form.

In a preferred embodiment, the compounds coming in solid form, advantageously in powder form, are compounds a) and e); whereas, the compounds coming in liquid form are the compounds b), c) and d).

According to another of the aspects thereof, the invention relates to a packaging method for a product using a heat shrink film such as described above. The heat shrinking can be done by heat shrinking techniques known to the person skilled in the art. For example, the product to be packaged is enveloped in a piece of film, which is next heat sealed. The product to be packaged may be a compacted powder tablet, like a detergent tablet.

The film is heat shrunk by going through an airflow at a temperature included between 80° C. and 200° C., preferably between 100 and 170° C., and even more preferably between 130 and 160° C., for a time included between 0.05 seconds and 60 seconds, preferably between 1 and 30 seconds, and still more preferably between 2 and 10 seconds. The film then takes on the shape of the packaged product.

According to an embodiment, before heat shrinking, the film is moistened with water or an equivalent liquid by means of a mister and/or a humidifier and/or a vaporizer for a time that may go from 0.01 seconds to 60 seconds, on at least one of the two surfaces and/or the edge of the tablet.

The heat shrinking can also be done by placing the film in an oven in which the relative humidity level can be controlled. The relative humidity level may, for example, be included between 10 and 80%, between 10 and 40%, or between 20 and 40%, or be greater than or equal to 30%.

According to an embodiment, the method comprises the following steps:
envelop the product to be packaged in a piece of film,
heat seal the film,
optionally, moisten the film, and
heat shrink the film at a temperature included between 80° C. and 200° C.

Examples

Production of Pellets and Film of Thermoplastic

The extruder used to make the following examples is a Clextral® brand BC 21 co-rotating twin screw, 25 mm diameter, 21 mm centerline distance, and 900 mm long extruder. This extruder comprises at least four zones:
a first zone for addition;
a second zone for addition;
a third zone for degassing; and
a fourth zone for die extrusion.

The rotation speed of the twin-screws is 125 RPM and the temperatures of the various zones are included between 70 and 120° C.

The first zone of the extruder is a zone for adding powders: caseinate and lecithin. The liquids (plasticizers) are added in the second zone. The extruder also comprises a zone for degassing to free air and a final zone consisting of a 4 mm diameter cylindrical rod die.

The following is the profile of the screw:
750 mm of direct step screw
50 mm of mixing screw
100 mm of inverse step screw At the outlet of the extruder, the rod is dried and put in a pelletizer to get 2 to 3 mm diameter pellets. The pellets are then transformed into film by film-blowing. The film-blower used is a Diani®, it has a 30 mm diameter and is equipped with an 80 mm diameter annular die. The film produced is about 30 cm wide and 50 µm thick. The resulting film is 1200 m long and is wound to form a roll. This roll of film is then used for packaging detergent tablets. A piece of film 107 mm×70 mm is used to envelop a 37 mm×27 mm×15 mm tablet. The film is then heat sealed at the ends thereof, longitudinally and transversely. Different film formulations were tested for packaging tablets.

Unrolling Test

The facility used in this test is shown in FIG. 6. It includes a roll (1) of film (2) to be tested (partially shown in FIG. 6).

This film (2) passes over a counter cylinder (3) before being wound on a drive cylinder (4) with a 10 cm diameter and 30 cm length, equipped with ASA-RT brand 50 N force sensor (5). The force sensor (5) is used to measure the tension near the winder of the film during unrolling. The drive cylinder (4) is rotated at a speed of 5 RPM, in order to unroll the roll (1) of in (2).

The film (2) has a thickness of 50 µm and a selvage to selvage width of 30 cm.

The force sensor (5) is used to quantify the concept of "sticky", which is an obstacle to use at industrial tempo.

If the force sensor indicates a force over 2 N (0.2 kg force) then the roll is described as 'sticky'.

Packaging Test

The packaged detergent tablets were stored for five days at 30° C. and 30% relative humidity. After that, each packaged tablet is grasped with latex gloves, shaken three times by holding one end with dry gloved fingers and placed in the palm of a dry-gloved hand and then the dry gloved fingers are closed on the tablet three times to crush it. If the film opens or breaks during this test, it is described as 'brittle'.

Printed Film

Figure 5A:
Figure 5B:
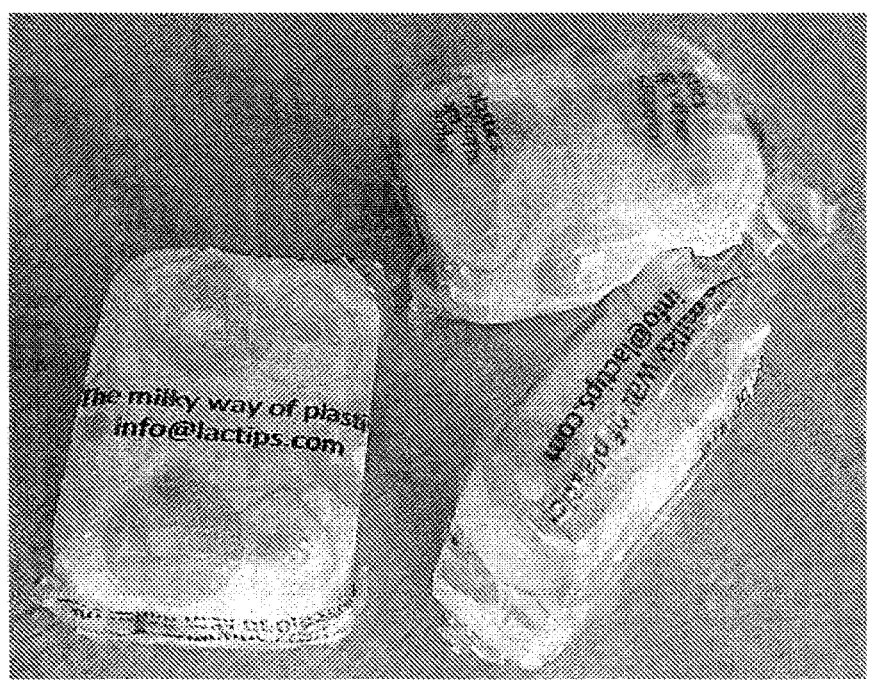

The film used for the packaging of the tablet shown in FIGS. 5A and 5B (according to example 5) is directly printed by flexography before rolling.

The results are shown in Table 1.

TABLE 1

Formulations tested and results of unrolling and packaging tests.

| Ex. | Formulation | | | | | | Unrolling of the films |
|---|---|---|---|---|---|---|---|
| | Caseinate | Glycerol | Oleic acid | Lecithin | water | Packaging | |
| comparative example 1 | 67.4 | 22.6 | 0 | 0 | 13 | brittle | sticky |
| comparative example 2 | 66.4 | 28.6 | 0 | 0 | 5 | brittle | OK |
| comparative example 3 | 62.9 | 27.1 | 0 | 0 | 10 | brittle | sticky |
| 4 | 62.1 | 23 | 4.7 | 1.2 | 9 | OK | OK |
| 5 | 63 | 23.5 | 1.1 | 2.3 | 10 | OK | OK |

Examples 1 to 3 are comparative examples; these films cannot be used industrially, because they do not pass the unrolling test and/or the packaging test.

Figure 1A:
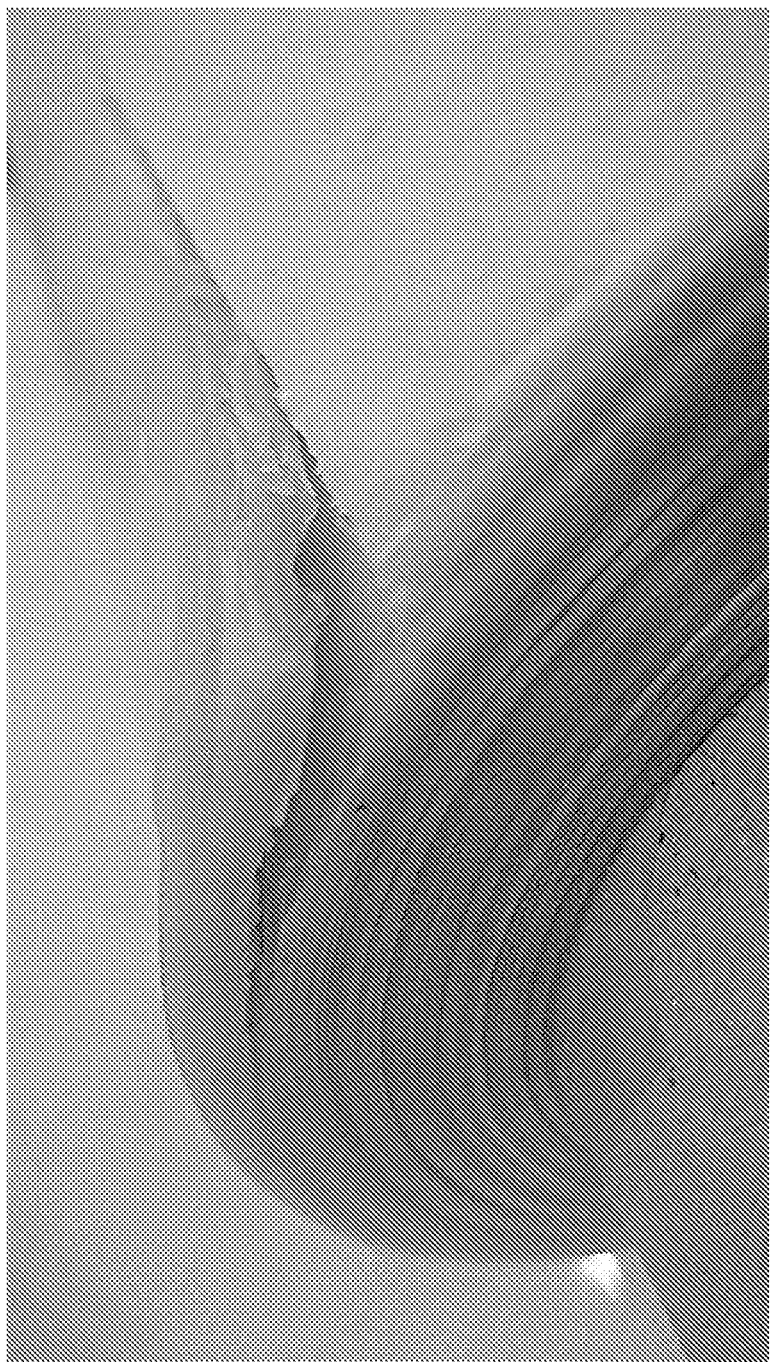
FIGS. 1A and 1B are photos of a roll of film that cannot be unwound according to comparative example 1.
Figure 1B:
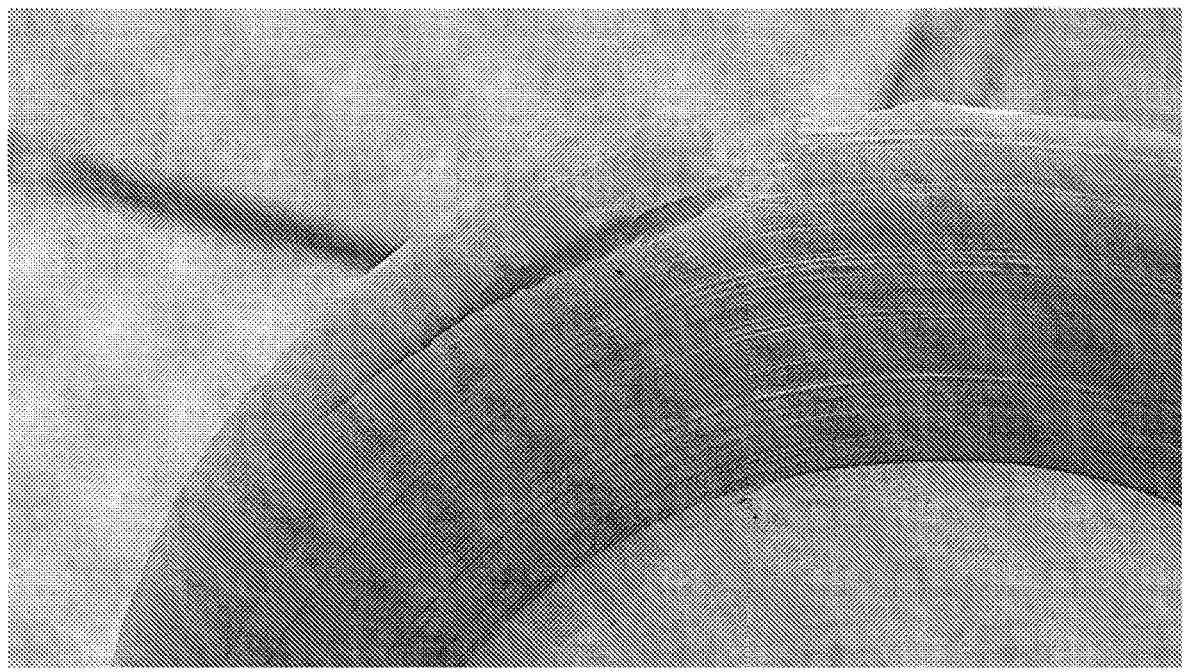

FIGS. 1A and 1B are photos of a roll of film that cannot be unwound according to comparative example 1.

Examples 4 and 5 are examples according to the invention, these films pass the packaging and unrolling tests; they may therefore be used industrially and be used for packaging detergent tablets.

Figure 2A:
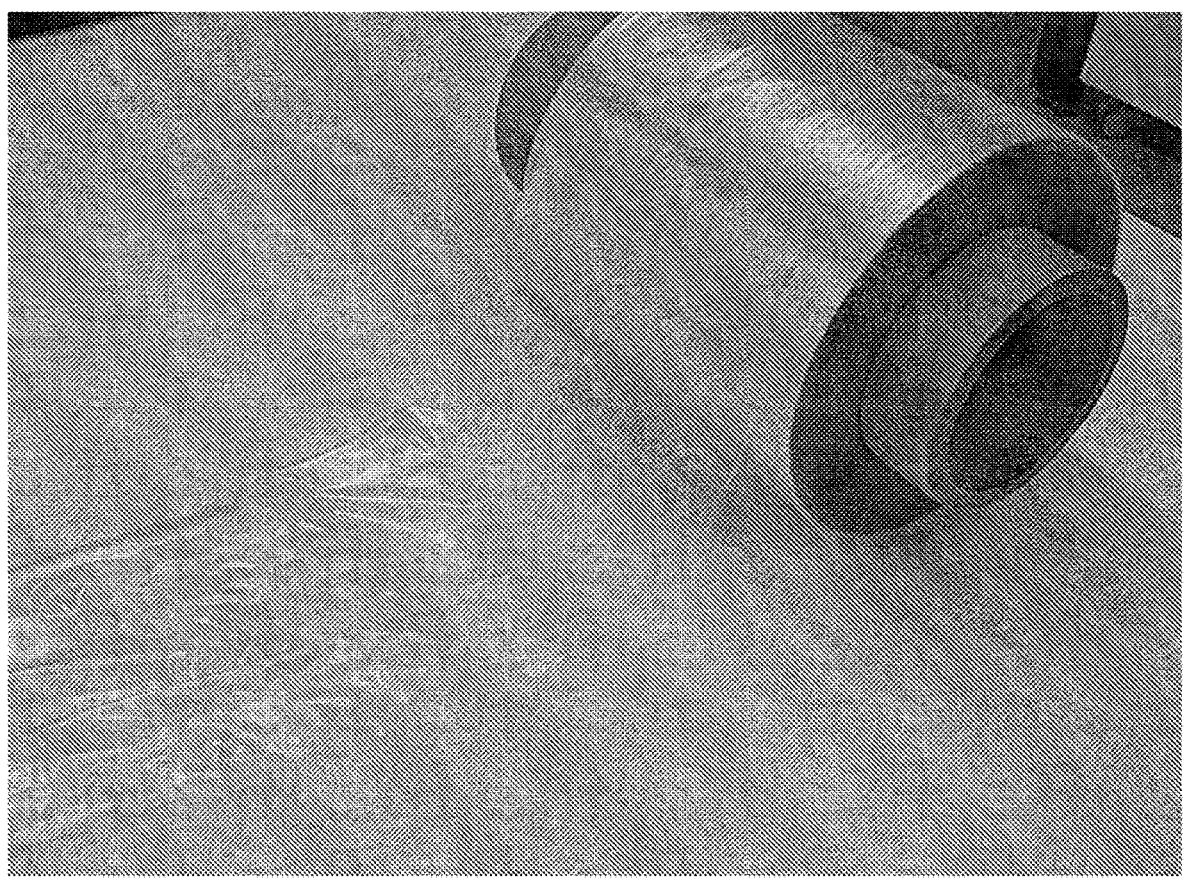
FIGS. 2A, 2B and 2C are photos of a roll of film that can be unwound according to comparative example 4.
Figure 2B:
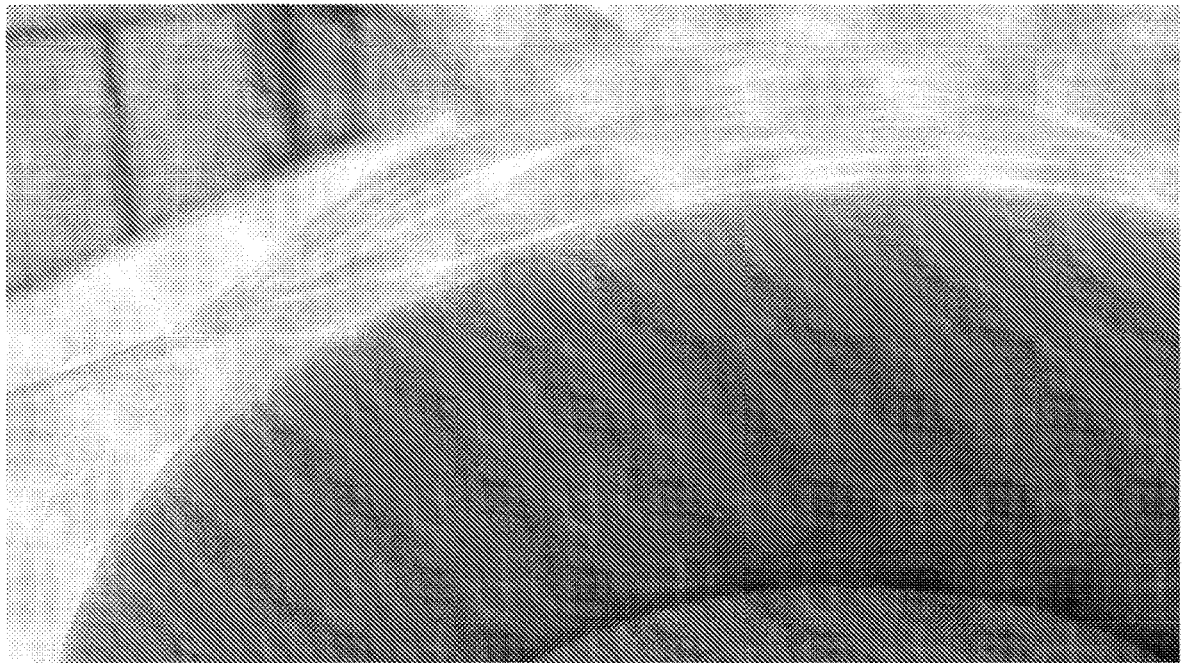
Figure 2C:
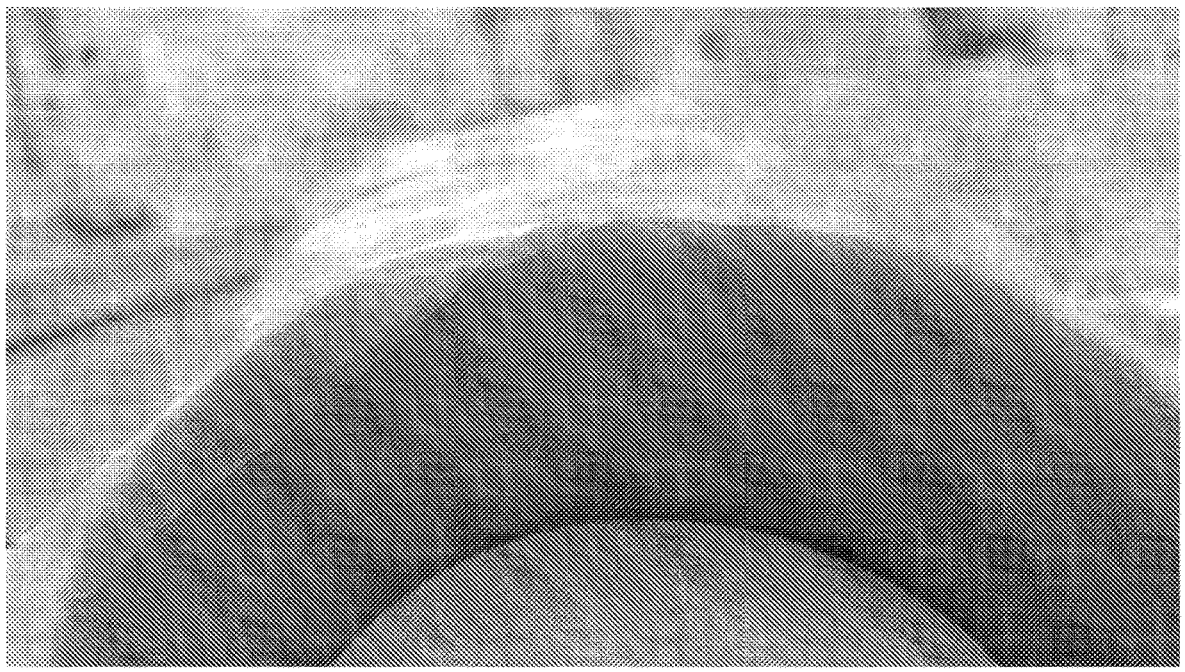

FIGS. 2A, 2A and 2C are photos of a roll of film that can be unwound according to comparative example 4.

These figures show the absence of sticky effect which is seen by an unwinding or unrolling force <200 g force in the unrolling test.

Figure 3A:
FIGS. 3A and 3B are photos of detergent tablets packaged in a film according to comparative example 1 after a five-day packaging test.
Figure 3B:

FIGS. 3A and 3B are photos of detergent tablets packaged in a film according to example 1 after a five-day packaging test.

The disintegration of the packaging film is clearly seen in these figures.

Figure 4:
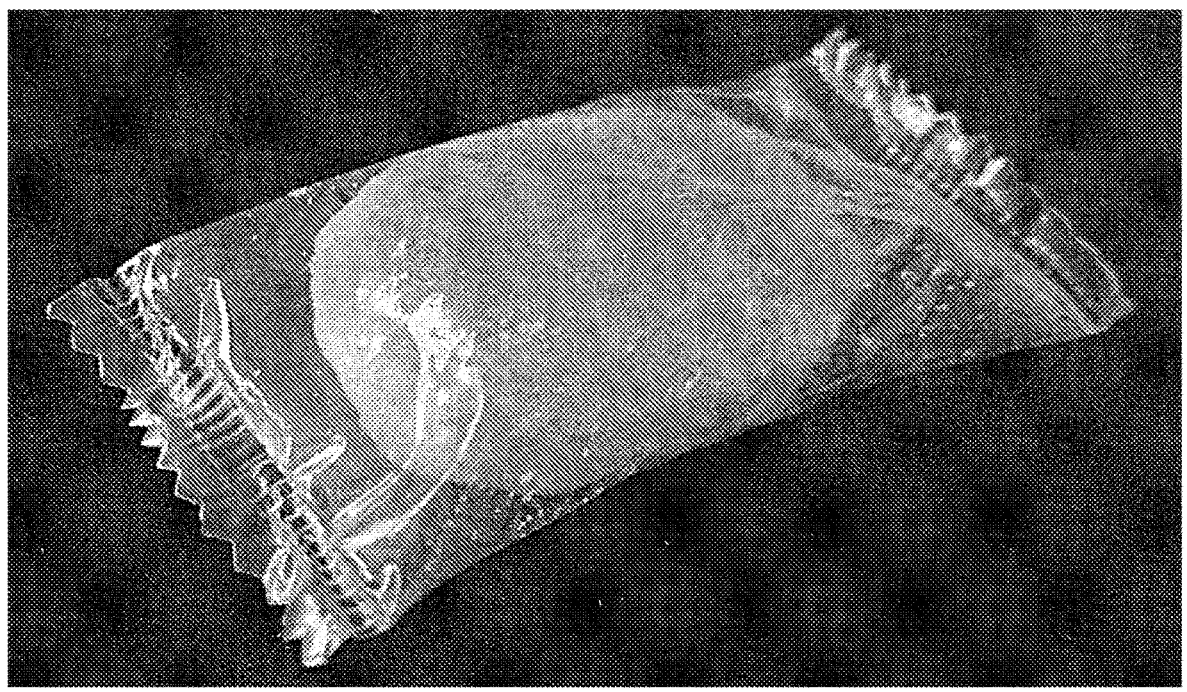
FIG. 4 is a photo of a detergent tablet packaged in a film according to comparative example 4 after a five-day packaging test.

FIG. 4 is a photo of a detergent tablet packaged in a film according to comparative example 4 after a five-day packaging test.

The packaging film is intact. There is no crack.

Photos 5A and 5B are photos of detergent tablets packaged in a printed film according to example 5 after a five-day packaging test.

There again the packaging film is intact and has no cracks. The printing present on the film is not deteriorated.

Heat Shrinking

A piece of film 5 cm×5 cm according to Example 5 is heat shrunk in an oven, in which the relative humidity level can be controlled, at 100° C. for 30 seconds. The level of heat shrinkage in the longitudinal and transverse directions is then measured. The results are shown in Table 2.

These results showed that the film according to Example 5 according to the invention is heat shrinkable.

TABLE 2

Each shrinkage rate

| % relative humidity in the oven | Heat shrinkage rate Longitudinal direction | Heat shrinkage rate Transverse direction |
| --- | --- | --- |
| 10% | 12% | 6% |
| 30% | 16% | 6% |

Injection

Biodegradable thermoplastic pellets according to Example 4 above were used for making injected parts. A Sumitomo brand injection press, Demag Systec 35-200 model, was used.

The temperatures of the cylinder and the nozzle were adjusted between 95 and 115° C.

The temperature the mold is 15° C. and the injection speed is 20 mm/s.

The photos 7A and 7B are photos of parts obtained by injection. These results show that it is possible to make objects from thermoplastic pellets according to the invention by injection.

The invention claimed is:

1. A biodegradable thermoplastic comprising, in % by mass:
   a) between 50 and 80% casein and/or caseinate;
   b) between 4 and 13% water;
   c) between 10 and 35% of at least one plasticizer different from b);
   d) between 0.1 and 8% of a hydrophobic agent, selected from carboxylic polyacid esters, C3-C33 carboxylic acids, and mixtures thereof; and
   e) between 0.5 and 6% of at least one surfactant.

2. The thermoplastic according to claim 1 wherein the plasticizer c) is selected from polyols, glycerol acetates, glycerol propionates and mixtures thereof.

3. The thermoplastic according to claim 1, wherein the hydrophobic agent d) is a C6-C28 unsaturated fatty acid.

4. The thermoplastic according to claim 1, wherein the surfactant e) is selected from zwitterionic surfactants whose HLB is included between 2 and 8.

5. The thermoplastic according to claim 1, wherein the ratio of the quantities e) to d) is greater than or equal to 1.

6. The thermoplastic according to claim 1, further comprising between 1 and 5% of an additive f) selected from sequestering agents.

7. The thermoplastic according to claim 1, further comprising an additive g) selected from colorings; protein coagulants; anticaking agents; sliding agents, selected from polyethylene glycols and fatty chain compounds, with a terminal amide; and mixtures thereof.

8. The thermoplastic according to claim 1, wherein the thermoplastic is hydrosoluble.

9. The thermoplastic according to claim 1, wherein the thermoplastic is edible.

10. The thermoplastic according to claim 1, wherein the thermoplastic is in form of pellets.

11. The thermoplastic according to claim 1, wherein the thermoplastic comprises a) between 52 and 75% of casein and/or caseinate.

12. The thermoplastic according to claim 1, wherein the thermoplastic comprises a) between 60 and 65% of casein and/or caseinate.

13. The thermoplastic according to claim 1, wherein the thermoplastic is in form of a film.

14. The thermoplastic according to claim 13 wherein the thermoplastic in the form of a film is printed.

15. The thermoplastic according to claim 13 wherein the thermoplastic is in a form of heat shrinkable film.

16. A product packaged by the thermoplastic according to claim 13.

17. The product according to claim 16 wherein the product comprises a detergent tablet.

18. The product according to claim 16 wherein the product comprises a food product.

19. The product according to claim 16 wherein the product comprises liquid shampoo.

20. An object obtained after transformation by extrusion casting, extrusion blowing, film blowing, solvent casting, calendaring, injection, heat forming or drawing of the thermoplastic according to claim 1.

21. A method for production of the thermoplastic according to claim 1, comprising the following steps:
   E1 using an extruder;
   E2 adding compounds a) to e), into the extruder;
   E3 retrieving at least one extruded rod of thermoplastic;
   E4 optionally, drying the rod;
   E5 optionally, crushing of the rod into pellets.

22. A method for packaging of a product using the thermoplastic according to claim 15, comprising the following steps:
   enveloping the product to be packaged in a piece of film,
   heat sealing the film, optionally, moistening the film, and
   heat shrinking the film at a temperature included between 80° C. and 200° C.

* * * * *